US012723712B2

(12) United States Patent
Szoucsek et al.

(10) Patent No.: US 12,723,712 B2
(45) Date of Patent: Sep. 1, 2026

(54) METHOD FOR PRODUCING A PRESSURE VESSEL

(71) Applicant: Voestalpine Rotec GmbH, Krieglach (AT)

(72) Inventors: Klaus Szoucsek, Haimhausen (DE); Jan Philip Ringert, Landshut (DE); Roland Ellerböck, Krieglach (AT)

(73) Assignee: Voestalpine Rotec GmbH, Krieglach (AT)

( * ) Notice: Subject to any disclaimer, the term of this patent is extended or adjusted under 35 U.S.C. 154(b) by 0 days.

(21) Appl. No.: 18/865,908

(22) PCT Filed: May 17, 2023

(86) PCT No.: PCT/EP2023/063307
§ 371 (c)(1),
(2) Date: Nov. 14, 2024

(87) PCT Pub. No.: WO2023/222786
PCT Pub. Date: Nov. 23, 2023

(65) Prior Publication Data

US 2025/0305632 A1 Oct. 2, 2025

(30) Foreign Application Priority Data

May 17, 2022 (DE) ..................... 10 2022 112 321.9

(51) Int. Cl.
*B21C 37/06* (2006.01)
*F17C 1/00* (2006.01)

(52) U.S. Cl.
CPC ................ *F17C 1/00* (2013.01); *B21C 37/06* (2013.01); *F17C 2201/0109* (2013.01); *F17C 2203/0612* (2013.01)

(58) Field of Classification Search
CPC ......... B21D 51/24; B21C 37/06; B21C 37/09; B21C 37/123; B21C 37/154
See application file for complete search history.

(56) References Cited

U.S. PATENT DOCUMENTS 6,089,399 A * 7/2000 Felbaum .............. B32B 15/013 220/582
9,512,964 B2 * 12/2016 Nakamura ............ B21D 51/24

FOREIGN PATENT DOCUMENTS

DE 102019130283 A1 5/2021
DE 102019134165 A1 6/2021
(Continued)

OTHER PUBLICATIONS

International Search Report issued in PCT/EP2023/063307, mailed Aug. 31, 2023.

*Primary Examiner* — Teresa M Ekiert
(74) *Attorney, Agent, or Firm* — Troutman Pepper Locke LLP; Scott D. Wofsy

(57) ABSTRACT

The invention relates to a method for producing a pressure vessel (1) for storing gaseous fuels, in particular for a motor vehicle, comprising the steps of providing a support tube (2), providing a blocking tube (3) which has an outer diameter (31) which is smaller than an inner diameter (22) of the support tube (2), arranging the blocking tube (3) inside the support tube (2), and deforming the support tube (2) in such a way that an inner surface (22a) of the support tube (2) rests against an outer surface (31*a*) of the blocking tube (3), in order to produce a double tube (4).

12 Claims, 2 Drawing Sheets

(56) References Cited

FOREIGN PATENT DOCUMENTS

Figure 1:
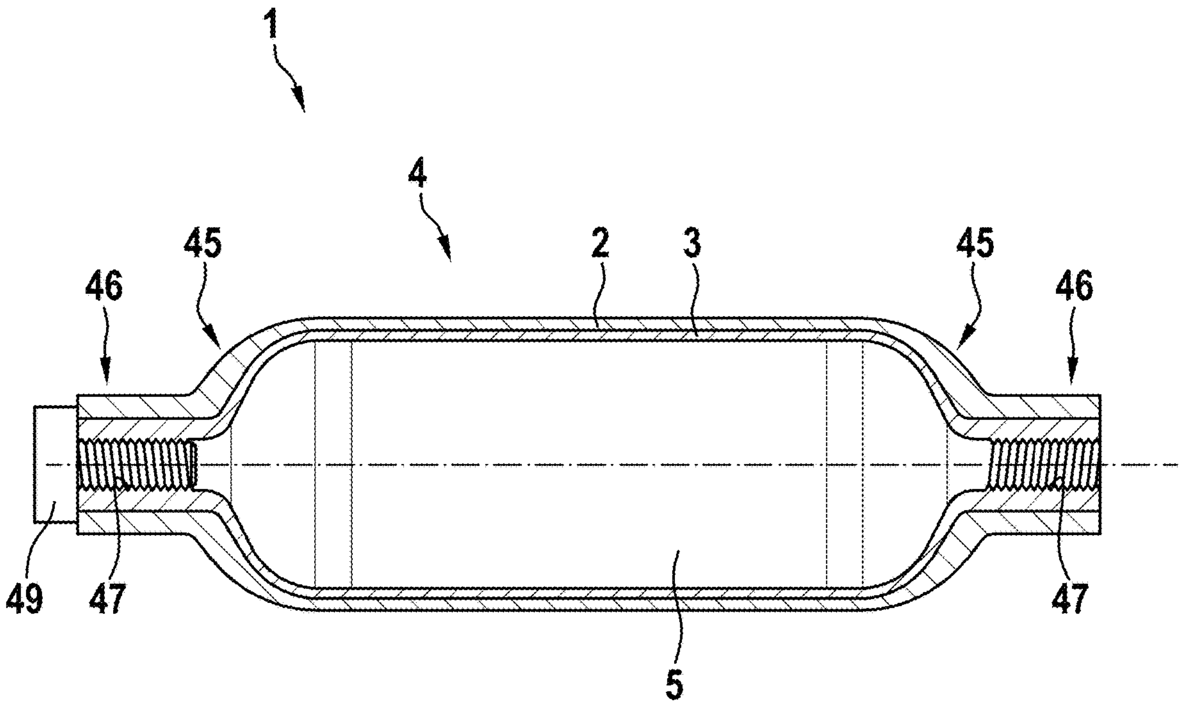

| | | | |
|---|---|---|---|
| EP | 2728240 | A1 | 5/2014 |
| ES | 2635277 | B1 | 4/2019 |

* cited by examiner

METHOD FOR PRODUCING A PRESSURE VESSEL

CROSS-REFERENCE TO RELATED APPLICATIONS

This application is a U.S. National Phase Application filed under 35 U.S.C. § 371, based on International Patent Application No. PCT/EP2023/063307, filed May 17, 2023, which claims priority to German Patent Application No. DE 10 2022 112 321.9, filed on May 17, 2022, which are incorporated herein by reference.

The invention relates to a method for producing a pressure vessel for storing gaseous fuels, in particular for a motor vehicle, and to such a pressure vessel.

Pressure vessels for storing fuels are known from the prior art. Storage often takes place under high pressure. Due to the high diffusivity of hydrogen and the tendency of materials in contact with hydrogen to become hydrogen embrittled, complex and expensive measures are required to prevent or at least reduce diffusion and hydrogen embrittlement, particularly when storing hydrogen. In the case of pressure vessels made of metal, for example steel, a special barrier layer is applied to the inside of the vessel wall. DE 10 2020 107 562 A1, for example, discloses that a barrier layer made of copper or a copper alloy is applied to the inside of the metal layer of the pressure vessel wall. The application of such barrier layers usually involves a great deal of effort and comparatively high costs.

It is therefore an object of the invention to provide a method for producing a pressure vessel which is simple and inexpensive to carry out and, in particular, is suitable for producing pressure vessels for storing highly diffusive substances. Furthermore, it is object of the invention to provide a pressure vessel which has a simple and inexpensive structure and which permits reliable efficient storage of fuels with high diffusivity.

This object is achieved by a method having the features of the independent claim. The dependent claims specify preferred embodiments of the invention.

The method according to the invention having the features of claim 1 provides the advantage that a pressure vessel can be produced particularly easily and inexpensively. It can be produced using simple tools and machines, and comparatively inexpensive and readily available materials can be used. According to the invention, this is achieved by a method comprising the steps:

provide a support tube, providing a blocking tube that has an outer diameter that is smaller than an inner diameter of the support tube, arranging the blocking tube inside the support tube, and deforming the support tube in such a way that an inner surface of the support tube rests against an outer surface of the blocking tube, in order to produce a double tube.

In other words, two separate tubes are provided and inserted into each other, for example arranged coaxially to each other. The outer support tube is then deformed, in particular exclusively, at least until it rests against the inner blocking tube, so that the two tubes form a common double tube. Advantageously, a comparatively low counterpressure can be generated by means of an inner mandrel in order to maintain the inner geometry as precisely as possible.

Preferably, the support tube is configured to provide mechanical stability of the pressure vessel, in particular to absorb the mechanical load resulting from filling the pressure vessel with a highly pressurized fuel. Preferably, the blocking tube is configured to provide a tight seal of the pressure vessel and/or to prevent contact between the support tube and a fuel that can be filled into the pressure vessel. Particularly preferably, the blocking tube is configured to minimize diffusion of fuel outside the pressure vessel.

The method thus provides the advantage that a pressure vessel with optimum properties for the reliable and efficient storage of highly diffusive gaseous fuels can be produced in a particularly simple and cost-effective manner. In particular, pressure vessels for storing hydrogen as a fuel can thus be provided in a particularly advantageous manner, which on the one hand can be provided with particularly low permeability for the hydrogen, and which on the other hand offer the possibility of minimizing hydrogen embrittlement by appropriate selection of the materials of the blocking tube and support tube.

A further advantage of the method is that the deformation of the support tube can take the form of radial compressing of the support tube, i.e., pressure forming or pressing. This means that the pressure vessel can be produced using simple and inexpensive machines and forming processes.

Preferably, the method also comprises the step that is carried out before the support tube is deformed: joint compressing of the support tube and blocking tube in the radial direction at a compression portion. Preferably, the compression portion is arranged at an axial end of the two tubes inserted into each other. In particular, the blocking tube and support tube are deformed in such a way that, after deformation, the outer diameter of the support tube is smaller than the outer diameter of the blocking tube before deformation. This fixes the two tubes together at the compression portion so that relative axial displacement is prevented. As a result, the subsequent deformation of the support tube can be carried out in a particularly targeted and precise manner in order to achieve the desired geometry.

Particularly preferably, the method also comprises the step which is carried out after the support tube has been deformed: Producing at least one dome-shaped end region by deforming a partial region of the double tube, preferably by means of hot-spin forming. In particular, a dome-shaped or essentially spherical taper of a part of the double tube is regarded as a dome-shaped end region. For example, a connecting piece can additionally, preferably simultaneously, be formed adjacent to the dome-shaped area. For example, such a connection piece can be used to connect the pressure vessel. In particular, the dome-shaped area is thus created by reducing the diameter of a section of the double tube by applying pressure in a radial direction. This allows the pressure vessel to be produced in a particularly simple and cost-effective manner, as such pressing can be carried out with little machine effort and in a particularly time-efficient manner, for example.

Preferably, the support tube is deformed by simultaneously radially compressing and axially stretching the support tube. This enables simple and targeted forming of the support tube in order to achieve the desired geometry. Furthermore, gentle forming can be carried out in order to provide optimum material properties for the pressure vessel.

Preferably, the method further comprises the step of separating the double tube into several double tube pieces in order to produce several pressure vessels. This means that the double tube is produced by deforming the support tube until its inner surface is in contact with the outside of the blocking tube, and preferably the joint compressing of the support tube and blocking tube is carried out on exactly one double tube, from which several separate pressure vessels can subsequently be produced. This provides a particularly efficient and cost-effective production method.

The blocking tube is preferably made of austenitic steel. Such a blocking tube provides the advantage that a particularly low diffusivity for hydrogen can be provided. In addition, such a blocking tube is less susceptible to hydrogen embrittlement. Preferably, the austenitic steel comprises at least one of the following components in the respective concentration:

- carbon up to 0.10% by weight, preferably 0.01% to 0.03% by weight;
- silicon up to 1.0% by weight, preferably 0.01% to 0.80% by weight;
- manganese up to 2.0 wt. %, preferably 0.3 wt. % to 1.5 wt. %;
- chromium up to 20% by weight, preferably 16.5% to 18.5% by weight;
- polybdenum up to 3.0% by weight, preferably 2.0% to 2.5% by weight;
- nickel up to 15% by weight, preferably 10.0% to 13.0% by weight;
- titanium up to 0.2% by weight, preferably 0.02% to 0.1% by weight;
- vanadium up to 0.2% by weight;
- aluminum up to 0.2% by weight, preferably 0.02% to 0.07% by weight;
- nitrogen up to 0.15% by weight, preferably up to 0.11% by weight;
- sulphur max. 0.015% by weight, preferably max. 0.008% by weight;
- phosphorus max. 0.045% by weight, preferably max. 0.025% by weight.

Particularly preferably, the austenitic steel comprises all of these components in the respective concentration, with the remainder preferably consisting of iron and impurities.

The support tube is also preferably made of martensitic steel. This provides the advantage that a particularly mechanically stable pressure vessel can be provided. In addition, the material costs for the pressure vessel can be reduced. Preferably, the martensitic steel comprises at least one of the following components in the respective concentration:

- carbon up to 0.45 wt %, preferably 0.36 wt % to 0.43 wt %;
- silicon up to 2.0% by weight, preferably 1.40% to 1.90% by weight, particularly preferably 1.60% to 1.75% by weight;
- manganese up to 1.0% by weight, preferably 0.40% to 0.90% by weight, particularly preferably 0.75% to 0.85% by weight;
- chromium up to 1.0% by weight, preferably 0.60% to 0.90% by weight, particularly preferably 0.75% to 0.85% by weight;
- molybdenum up to 0.50% by weight, preferably 0.35% to 0.45% by weight;
- nickel up to 2.0 wt. %, preferably 1.20 wt. % to 1.90 wt. %, particularly preferably 1.70 wt. % to 1.80 wt. %;
- titanium up to 0.2% by weight; —vanadium up to 0.2 wt. %, preferably 0.05 wt. % to 0.15 wt. %, particularly preferably 0.070 wt. % to 0.090 wt. %;
- aluminum up to 0.2% by weight, preferably 0.01% to 0.04% by weight;
- nitrogen up to 0.15% by weight, preferably up to 0.10% by weight;
- sulphur max. 0.015 wt. %, preferably max. 0.008 wt. %;
- phosphorus max. 0.025% by weight, preferably max. 0.015% by weight.

Particularly preferably, the martensitic steel comprises all of these components in the respective concentration, with the remainder preferably consisting of iron and impurities.

Preferably, the blocking tube and the support tube are made of materials that have essentially the same coefficient of thermal expansion. This ensures that the thermal expansion of these two components of the pressure vessel is similar, which means that gaps and/or undesirable stresses can be avoided, for example. Alternatively, the blocking tube is preferably formed from a material that has a greater coefficient of thermal expansion than a material of the support tube. This ensures, for example, that the blocking tube expands more than the support tube when heated. This causes the two tubes to form a press connection when the double tube and/or the pressure vessel is heated, for example instead of loosening or forming a gap between the two tubes.

Preferably, a first wall thickness of the blocking tube is at most 80%, preferably at most 50%, particularly preferably at most 30% of a second wall thickness of the support tube. This means that the blocking tube has thinner walls than the support tube. This makes it possible to provide a particularly cost-effective pressure vessel, especially if the blocking tube is made of an austenitic steel and the support tube is made of a martensitic steel.

A further preferred outer diameter of the blocking tube is at most 95%, preferably at most 80%, particularly preferably at least 60%, of the inner diameter of the support tube. Preferably, a state before the support tube is deformed is considered. In particular, there is therefore a radial gap between the two tubes before deformation. Such a radial gap is preferably at least 5 mm, preferably at most 10 mm. This allows the two tubes to be inserted into each other particularly easily and smoothly.

Particularly preferably, the method also comprises the step of heat treating the double tube, preferably after the dome-shaped end region has been produced. This allows particularly advantageous material properties, such as high strength of the pressure vessel, to be achieved.

Preferably, the heat treatment comprises the following steps in the order mentioned:

- hardening,
- quenching,
- first tempering,
- air cooling,
- second tempering, and
- air cooling Preferably, the method also comprises the step of coating the double tube, preferably with an anti-corrosion coating, in particular on an outer side of the double tube. This makes it possible to provide a particularly durable pressure vessel that is resistant to external environmental influences.

Furthermore, the invention leads to a pressure vessel for storing gaseous fuels, in particular for a motor vehicle, wherein the pressure vessel is produced by means of the method described above. The pressure vessel is thus characterized by a simple and cost-effective structure, wherein a high resistance to hydrogen embrittlement and diffusion of hydrogen from the pressure vessel to the outside can be made possible.

Figure 2:
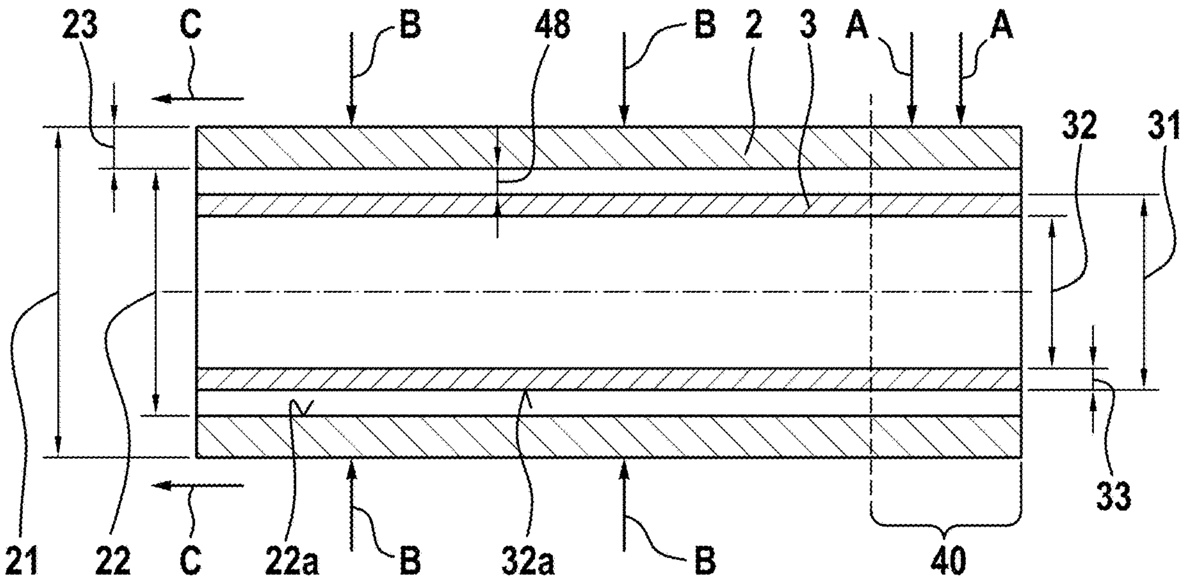
Figure 3:
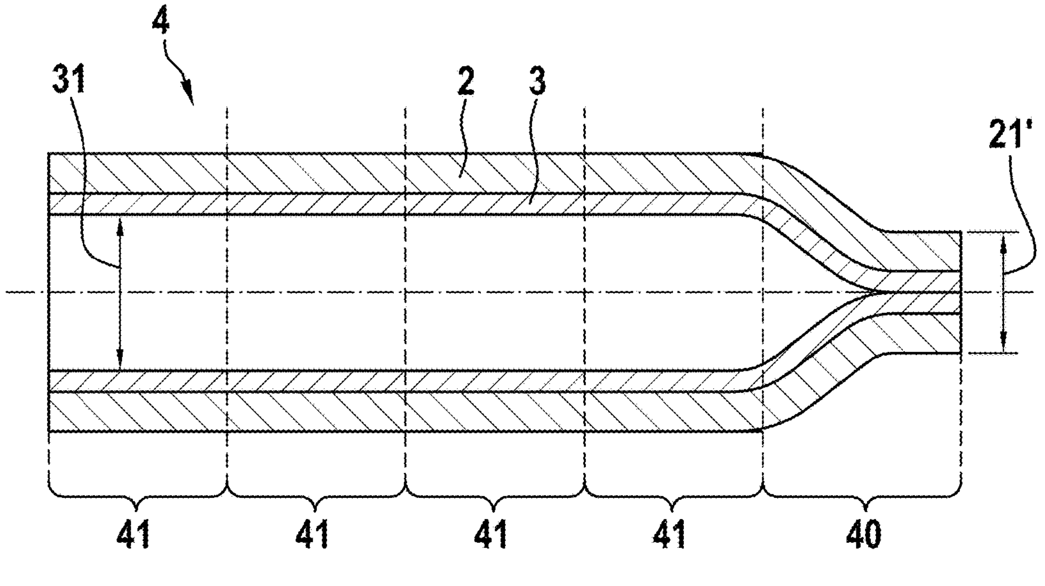

Further details, advantages and features of the present invention result from the following description of embodiments based on the drawing. The Figures show in:

FIG. 1 a simplified schematic sectional view of a pressure vessel according to a preferred embodiment of the invention, FIG. 2 a step of a production method of the pressure vessel of FIG. 1, and FIG. 3 another step of the production method of the pressure vessel of FIG. 1.

With reference to FIGS. 1 to 3, a vessel 1 and a method for producing the pressure vessel according to a preferred embodiment of the invention are described below. In the figures, functional components are always marked with the same reference characters.

The pressure vessel 1 is intended for storing gaseous fuels, which can preferably be used as fuels for motor vehicles. In particular, the vessel 1 is intended for storing gaseous hydrogen under high pressure.

To produce the pressure vessel 1, a support tube 2 and a blocking tube 3 are first provided (see FIG. 2). The blocking tube 3 has an outer diameter 31 that is smaller than an inner diameter 22 of the support tube 2.

A first wall thickness 33 of the blocking tube 3 is smaller than a second wall thickness 23 of the support tube 2. Preferably, the first wall thickness 33 is at most 50% of the second wall thickness 23.

The two tubes 2 and 3 are made of steel. In detail, the blocking tube 3 is made of austenitic steel and the support tube 2 is made of martensitic steel.

Furthermore, the materials of the two tubes 2, 3 are selected in such a way that the blocking tube 3 is made of a material that has a greater coefficient of thermal expansion than a material of the support tube.

At the start of the production method, the blocking tube 3 is arranged inside the support tube 2, for example coaxially to each other as shown in FIG. 2. In this configuration, there is a gap 48 in the radial direction between the two tubes 2, 3.

The two tubes are then compressed together in this inserted configuration. Both the support tube 2 and the blocking tube 3 are deformed in the radial direction in such a way that, after deformation, an outer diameter 21' of the support tube 2 after deformation is smaller than an inner diameter 32 of the blocking tube 3 before deformation (see FIGS. 2 and 3). The compression of support tube 2 and blocking tube 3 only takes place within a compression portion 40, which is located at one axial end of the two tubes 2, 3. As a result, the blocking tube 3 and support tube 2 are held axially immobile against each other by means of the compression portion 40.

The support tube 2 is then deformed. The support tube 2 is simultaneously compressed in a radial direction (see arrows B in FIG. 2) and stretched in an axial direction (see arrows C in FIG. 2). The support tube 2 is deformed until it rests against an outer surface 31*a* of the blocking tube 3, preferably in such a way that a press connection is created between the support tube 2 and the blocking tube 3. A double tube 4 is thus formed from the support tube 2 and the blocking tube 3. The double tube 4 is shown in FIG. 3.

The double tube 4 is then separated into several double tube pieces 41 along the axial direction. A separate pressure vessel 1 can then be produced from each of these double tube pieces 41.

To produce the pressure vessel 1, a dome-shaped end region 45 and a connection region 46 are then produced at each axial end of the double tube piece 41 (see FIG. 1).

The dome-shaped end region 45 forms a dome-shaped taper of the inner and outer contour of the double tube piece 41, which opens into the connection region 46. The connection region 46 is formed as a straight tubular end piece of the pressure vessel 1.

To produce the dome-shaped end region 45 and the connection region 46, the corresponding double tube piece 41 is deformed radially inwards in certain areas using a pressure forming process, preferably hot-spin forming.

Subsequently, an internal thread 47 can be formed on the inner circumference of each of the connection regions 46, by means of which, for example, a connection member 49 can be connected to the pressure vessel 1. By means of the connection member 49, for example, an inner cavity 5 of the pressure vessel, in which the gaseous fuel can be stored under pressure, can be brought into fluid connection with a line via which the gaseous fuels can be transported further, for example to a consumer. At the connection region 46 opposite the connection member 49, for example, a closure element can be provided in order to close the cavity 5 at this end of the pressure vessel 1 in a fluid-tight manner.

LIST OF REFERENCE CHARACTERS

1 pressure vessel
2 support tube
3 blocking tube
4 double tube
5 cavity
21 outer diameter of support tube
22 inner diameter of support tube
22*a* inner surface of support tube
23 second wall thickness of support tube
31 outer diameter of blocking tube
32 inner diameter of blocking tube
32*a* outer surface of blocking tube
33 first wall thickness of blocking tube
40 compression portion
41 double tube pieces
45 dome-shaped end region
46 connection region
47 internal thread
48 gap
49 connection member

The invention claimed is:

1. Method for producing a pressure vessel for storing gaseous fuels for a motor vehicle, comprising the steps of:
- providing a support tube, providing a blocking tube which has an outer diameter which is smaller than an inner diameter of the support tube,
- arranging the blocking tube inside the support tube,
- deforming the support tube in such a way that an inner surface of the support tube rests against an outer surface of the blocking tube, in order to produce a double tube, and
- separating the double tube into several double tube pieces to produce several pressure vessels.

2. Method according to claim 1, further comprising the step, before deforming the support tube: joint compressing of support tube and blocking tube in the radial direction at a compression portion, which is located in particular at an axial end of the two tubes.

3. Method according to claim 1, further comprising the step, after deforming the support tube: producing at least one dome-shaped end region by deforming the double tube, by means of hot-spin forming.

4. Method according to claim 1, wherein deforming the support tube is effected by simultaneous radial compression and axial stretching.

5. Method according to claim 1, wherein the blocking tube is formed from an austenitic steel.

6. Method according to claim 1, wherein the support tube is formed from a martensitic steel.

7. Method according to claim 1, wherein the blocking tube and the support tube are formed from materials with substantially the same coefficient of thermal expansion, or wherein the blocking tube is formed from a material which has a greater coefficient of thermal expansion than a material of the support tube.

8. Method according to claim 1, wherein a first wall thickness of the blocking tube is at most 80%, or at most 50%, or at most 30%, of a second wall thickness of the support tube.

9. Method according to claim 1, wherein the outer diameter of the blocking tube is at most 95%, or at most 80%, and at least 60%, of the inner diameter of the support tube.

10. Method according to claim 1, further comprising the step of: heat treatment of the double tube.

11. Method according to claim 10, wherein the heat treatment comprises the successive steps of: hardening, quenching, first tempering, air cooling, second tempering, air cooling.

12. Method according to claim 1, further comprising the step of: coating the double tube with an anti-corrosion coating.

* * * * *